United States Patent
Lumbab et al.

(10) Patent No.: US 9,708,072 B2
(45) Date of Patent: Jul. 18, 2017

(54) AIRCRAFT ENGINE NACELLE BULKHEADS AND METHODS OF ASSEMBLING THE SAME

(71) Applicant: The Boeing Company, Seal Beach, CA (US)

(72) Inventors: Alex C. Lumbab, Bothell, WA (US); Bradley Scott Leisten, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 325 days.

(21) Appl. No.: 14/266,404

(22) Filed: Apr. 30, 2014

(65) Prior Publication Data

US 2015/0314882 A1 Nov. 5, 2015

(51) Int. Cl.
*B64D 29/00* (2006.01)
*F01D 25/02* (2006.01)
*B64D 29/06* (2006.01)
*F01D 25/00* (2006.01)

(52) U.S. Cl.
CPC .............. *B64D 29/00* (2013.01); *B64D 29/06* (2013.01); *F01D 25/005* (2013.01); *F01D 25/02* (2013.01); *F05D 2260/20* (2013.01); *F05D 2260/96* (2013.01); *Y10T 29/49828* (2015.01)

(58) Field of Classification Search
CPC ......... B64D 29/00; B64D 29/06; F01D 25/02; F01D 25/005; Y10T 29/49828; F05D 2260/96; F05D 2260/20
USPC .................. 415/119; 244/53 B, 130; 29/897, 29/897.15, 897.32
See application file for complete search history.

(56) References Cited

U.S. PATENT DOCUMENTS

| | | |
|---|---|---|
| 3,806,928 A | 4/1974 | Costanza |
| 4,539,244 A | 9/1985 | Beggs et al. |
| 4,738,416 A | 4/1988 | Birbragher |
| 5,041,323 A | 8/1991 | Rose et al. |
| 5,156,362 A | 10/1992 | Leon |
| 5,344,280 A | 9/1994 | Langenbrunner et al. |
| 5,653,836 A | 8/1997 | Mnich et al. |
| 6,203,656 B1 | 3/2001 | Syed |
| 6,268,038 B1 | 7/2001 | Porte et al. |

(Continued)

FOREIGN PATENT DOCUMENTS

| | | |
|---|---|---|
| EP | 0911803 A2 | 4/1999 |
| EP | 2241504 A2 | 10/2010 |

(Continued)

OTHER PUBLICATIONS

Search Report for Application No. GB1503044.8, Jul. 17, 2015, 3 pages.

(Continued)

*Primary Examiner* — Hoang Nguyen
(74) *Attorney, Agent, or Firm* — Armstrong Teasdale LLP

(57) ABSTRACT

An engine nacelle includes an exterior wall and an interior wall. A forward bulkhead is coupled between the interior wall and the exterior wall, wherein the forward bulkhead comprises a curvilinear body portion that extends between the interior wall and the exterior wall. The engine nacelle also includes an aft bulkhead coupled between the interior wall and the exterior wall, wherein the aft bulkhead comprises a curvilinear body portion that extends between the interior wall and the exterior wall.

20 Claims, 3 Drawing Sheets

(56) References Cited

U.S. PATENT DOCUMENTS

| | | | |
|---|---|---|---|
| 6,371,242 B1 | 4/2002 | Wilson et al. | |
| 6,536,556 B2 | 3/2003 | Porte et al. | |
| 6,607,625 B2 | 8/2003 | Andre et al. | |
| 6,615,950 B2 | 9/2003 | Porte et al. | |
| 6,688,558 B2 | 2/2004 | Breer et al. | |
| 6,749,704 B2 | 6/2004 | Boussu et al. | |
| 6,755,280 B2 | 6/2004 | Porte et al. | |
| 6,761,245 B2 | 7/2004 | Porte | |
| 6,772,857 B2 | 8/2004 | Porte et al. | |
| 6,820,337 B2 | 11/2004 | Buge et al. | |
| 6,840,349 B2 | 1/2005 | Andre et al. | |
| 6,896,099 B2 | 5/2005 | Porte et al. | |
| 6,923,931 B2 | 8/2005 | Dublineau et al. | |
| 7,257,894 B2 | 8/2007 | Buge et al. | |
| 7,338,696 B2 | 3/2008 | Rambaud et al. | |
| 7,484,592 B2 | 2/2009 | Porte et al. | |
| 7,503,425 B2 | 3/2009 | Strunk | |
| 7,780,117 B2 | 8/2010 | Botura et al. | |
| 7,790,082 B2 | 9/2010 | Buge et al. | |
| 7,857,093 B2 * | 12/2010 | Sternberger | B64D 33/02 181/213 |
| 7,921,966 B2 | 4/2011 | Chiou et al. | |
| 7,923,668 B2 | 4/2011 | Layland et al. | |
| 8,067,097 B2 | 11/2011 | Mueller | |
| 8,181,900 B2 | 5/2012 | Chene et al. | |
| 8,240,982 B2 | 8/2012 | Vauchel | |
| 8,740,137 B2 | 6/2014 | Vauchel et al. | |
| 8,863,893 B2 | 10/2014 | Sternberger et al. | |
| 8,899,512 B2 | 12/2014 | Vauchel et al. | |
| 8,919,494 B2 | 12/2014 | Burkett et al. | |
| 9,027,884 B2 | 5/2015 | Valleroy et al. | |
| 2002/0157764 A1 | 10/2002 | Andre et al. | |
| 2003/0021976 A1 | 1/2003 | Dublineau et al. | |
| 2003/0042657 A1 | 3/2003 | Dublineau et al. | |
| 2004/0023026 A1 | 2/2004 | Rambaud et al. | |
| 2004/0065775 A1 | 4/2004 | Buge et al. | |
| 2004/0148891 A1 | 8/2004 | Porte et al. | |
| 2004/0227276 A1 | 11/2004 | Buge et al. | |
| 2004/0237502 A1 | 12/2004 | Moe et al. | |
| 2005/0006529 A1 | 1/2005 | Moe et al. | |
| 2005/0081992 A1 | 4/2005 | Buge et al. | |
| 2005/0082112 A1 * | 4/2005 | Harrison | B64D 29/00 181/214 |
| 2005/0254955 A1 | 11/2005 | Helder et al. | |
| 2006/0145001 A1 * | 7/2006 | Smith | B64D 29/06 244/110 B |
| 2006/0219475 A1 | 10/2006 | Olsen et al. | |
| 2007/0210073 A1 | 9/2007 | Hubert et al. | |
| 2008/0179448 A1 | 7/2008 | Layland et al. | |
| 2008/0248278 A1 | 10/2008 | Fisher et al. | |
| 2009/0140104 A1 | 6/2009 | Surply et al. | |
| 2010/0084507 A1 | 4/2010 | Vauchel et al. | |
| 2010/0176250 A1 | 7/2010 | Porte | |
| 2010/0199629 A1 | 8/2010 | Chene et al. | |
| 2010/0252689 A1 | 10/2010 | Vauchel et al. | |
| 2010/0260602 A1 * | 10/2010 | Binks | B64D 29/08 415/214.1 |
| 2011/0142615 A1 | 6/2011 | Riou et al. | |
| 2011/0147534 A1 | 6/2011 | Chelin et al. | |
| 2011/0162429 A1 | 7/2011 | Leacock et al. | |
| 2011/0248117 A1 | 10/2011 | Boock et al. | |
| 2013/0126265 A1 * | 5/2013 | Sternberger | B64D 33/02 181/214 |
| 2013/0283821 A1 | 10/2013 | Gilson et al. | |
| 2015/0129045 A1 * | 5/2015 | Kane | B64D 33/02 137/15.1 |

FOREIGN PATENT DOCUMENTS

| | | |
|---|---|---|
| GB | 1490923 A | 11/1977 |
| GB | 2273131 A | 6/1994 |
| WO | 2012116999 A1 | 9/2012 |
| WO | 2014170609 A1 | 10/2014 |

OTHER PUBLICATIONS

Combined Search and Examination Report, dated Oct. 26, 2015, for co-pending patent application No. GB 1506925.5 (5 pgs.).
HexWeb Acousti-Cap product information, retrieved on Feb. 19, 2014 from website http://www.hexcel.com/Resources/DataSheets/Brochure-Data-Sheets/HexWeb_Acousti-Cap.pdf (4 pgs).
GB Search and Examination Report, dated May 3, 2016, for copending GB patent application No. GB1506925.5 (6 pages).
Great Britain Search and Examination Report dated Jul. 26, 2016 for related application GB1611630.3; 7 pp.
GB Combined Search and Examination Report, dated Jul. 26, 2016 for related application GB1611630.3; 7 pp.
Great Britain Office Action for Application No. GB1611630.3, dated Sep. 28, 2016, 4 pages.

* cited by examiner

000

AIRCRAFT ENGINE NACELLE BULKHEADS AND METHODS OF ASSEMBLING THE SAME

BACKGROUND

The field of the disclosure relates generally to aircraft engine nacelles, and, more particularly, to aircraft engine nacelles having at least one bulkhead and methods of assembling the same.

At least some known engines, such as some known jet engines and turbofan jet engines, are surrounded by a generally barrel-shaped nacelle. At least some known nacelles include a lipskin that includes a substantially airfoil-shaped exterior wall and an interior wall that at least partially defines an inlet opening of the engine. The exterior and interior walls define a cavity therebetween that generally includes a forward bulkhead that forms a first plenum defined between the forward bulkhead and the lipskin, and an aft bulkhead spaced a distance from the forward bulkhead to define a second plenum therebetween.

At least some known forward bulkheads are substantially flat in shape and are configured to provide structural support for the exterior wall of the nacelle and to provide resistance to foreign object, such as a bird, penetration through the forward bulkhead and into the second plenum. Furthermore, at least some known nacelles include insulating materials positioned proximate the forward bulkhead to reduce heat transfer of heated de-icing air from within the first plenum to the second plenum. However, such insulating materials may significantly add to the weight of the aircraft. Moreover, at least some known forward bulkheads are formed from materials that are heavy and expensive. Such materials may also be different than those of the lipskin such that the materials have different coefficients of thermal expansion. As such, the forward bulkhead and lipskin expand and contract at different rates when exposed to changing temperatures such that the aerodynamic performance of the nacelle may be reduced.

At least some known engine nacelles include aft bulkheads that are also substantially flat in shape. The aft bulkheads are generally configured to provide additional impact resistance to objects that may penetrate the lipskin and forward bulkhead. Additionally, the aft bulkhead is configured to endure a fan blade out event, that is, the aft bulkhead is configured to withstand a portion of the impact of an engine blade thrown by the engine during operation. At least some known nacelles include a crush zone component coupled radially inward of the aft bulkhead that is configured to bear the majority of the load imparted by a fan blade out event. However, these components add to the weight, cost, and complexity of the nacelle.

BRIEF DESCRIPTION

In one aspect, an engine nacelle is provided. The engine nacelle includes an exterior wall and an interior wall. A forward bulkhead is coupled between the interior wall and the exterior wall, wherein the forward bulkhead comprises a curvilinear body portion that extends between the interior wall and the exterior wall. The engine nacelle also includes an aft bulkhead coupled between the interior wall and the exterior wall, wherein the aft bulkhead comprises a curvilinear body portion that extends between the interior wall and the exterior wall.

In another aspect, an aircraft is provided. The aircraft includes an engine nacelle including a lipskin having a first segment and a second segment. The nacelle also includes a structural inner barrel, a forward bulkhead, and an aft bulkhead. The forward bulkhead includes a curvilinear body portion that extends between one of the first segment or the inner barrel and the second segment. The aft bulkhead is axially-spaced from the forward bulkhead and includes a curvilinear body portion that extends between the structural inner barrel and the second segment.

In another aspect, a method of assembling an engine nacelle having an interior wall and an exterior wall is provided. The method includes coupling a forward bulkhead between the interior wall and the exterior wall, wherein the forward bulkhead includes a curvilinear body portion that extends between the interior wall and the exterior wall. The method also includes coupling an aft bulkhead between the interior wall and the exterior wall, wherein the aft bulkhead includes a curvilinear body portion that extends between the interior wall and the exterior wall.

DETAILED DESCRIPTION

Figure 1:
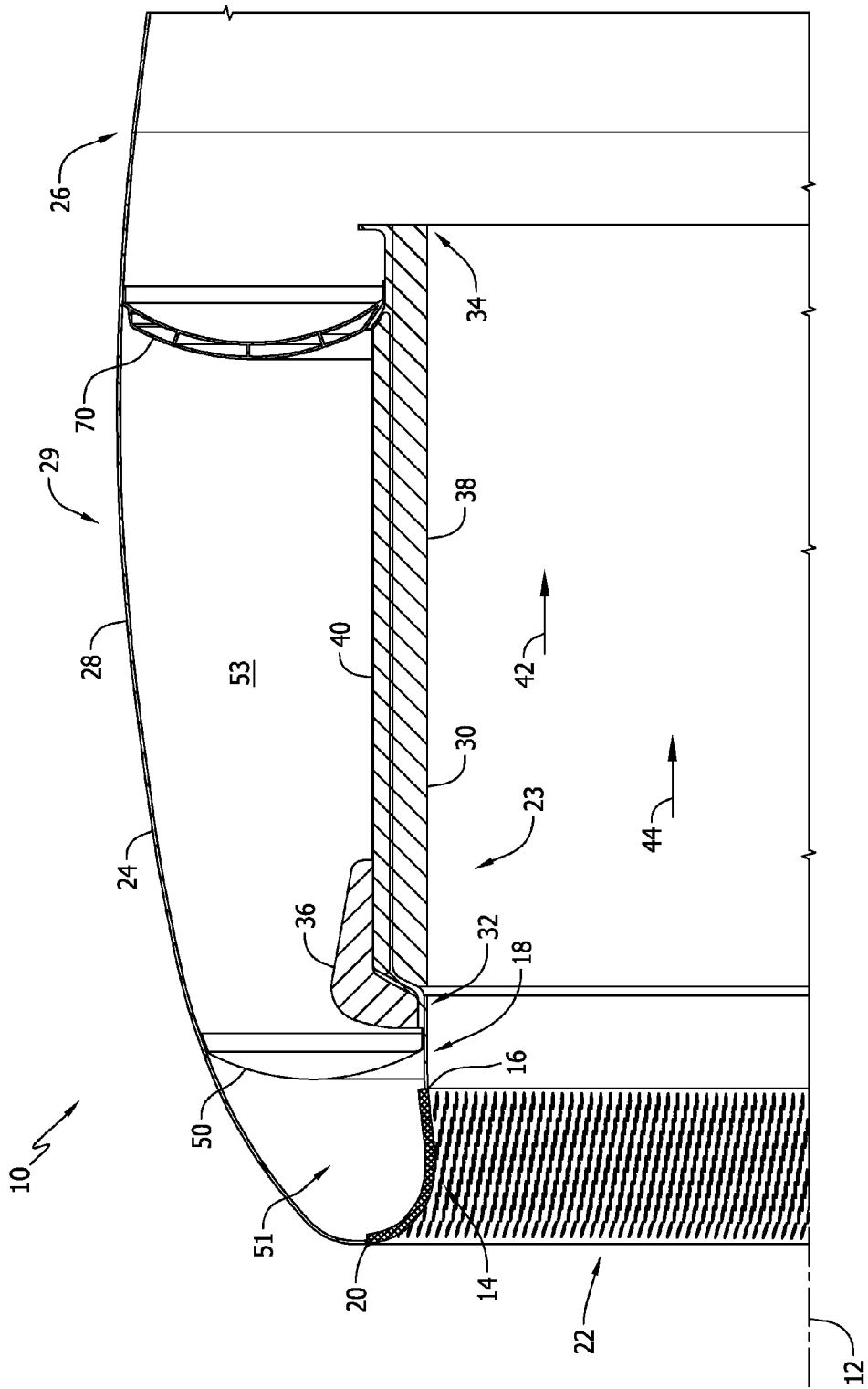
FIG. 1 is a schematic cross-sectional view of an implementation of an engine nacelle.

The apparatus and methods described herein provide for a lightweight and efficient engine nacelle that attenuates noise promulgating from the engine while also providing increased structural rigidity. The engine nacelle includes a lipskin assembly comprising a lipskin that includes a first segment and a second segment that are coupled together at a location proximate to a hilite of the nacelle. The second segment extends sufficiently far downstream to reduce or eliminate a need for at least one closeout panel aft of the lipskin. In addition to separately formed first and second segments, the embodiments provide for superplastic, or alternatively non-superplastic, stretch-forming of the first and second segments to facilitate reducing or eliminating ripples and/or waves in the lipskin. As such, the lipskin described herein unexpectedly reduces or eliminates a premature transition from natural laminar air flow to turbulent air flow as compared to conventional lipskins.

Moreover, the lipskin assembly may include a linear facesheet coupled between an acoustic core and the lipskin. Each of the acoustic core, linear facesheet, and lipskin include a plurality of openings that facilitate channeling heated air therethrough to provide ice prevention measures on the nacelle. The openings in the linear facesheet form a plurality of tortuous paths that facilitate damping the noise generated by the engine within the nacelle. As such, the lipskin itself may not be relied upon to perform noise attenuation, which may allow for openings in the lipskin to be fewer in number and larger than those in other conventional lipskin. More specifically, the lipskin openings can be elongated in a direction of airflow to facilitate an increased percent open area of the lipskin while maintaining structural integrity of the lipskin and reducing excrescence drag. As such, the lipskin assembly facilitates an ease of manufacture of the nacelle by avoiding a time- and cost-intensive lipskin opening formation process.

Furthermore, the engine nacelle may provide for additional noise attenuation using a plurality of generally concentric cores. A thickness of a first of the plurality of cores is not equal to a thickness of a second of the plurality of cores, such that the second core complements a damping provided by first core. Because the first and second cores may not be relied upon to meet structural strength requirements of the nacelle, the cells in the first core generally may not be aligned with the cells in a second core, facilitating an ease of manufacture of the nacelle by avoiding a time- and cost-intensive cell alignment and/or cell-by-cell septumization process. In addition, the apparatus and methods described herein provide a core linear facesheet that is similar to the lipskin described above in that the core linear facesheet includes elongated orifices that facilitate an increased percent open area of the facesheet while maintaining structural integrity of the facesheet and reducing excrescence drag.

The structural rigidity of the nacelle may be provided by a forward bulkheads and an aft bulkhead. Each of the forward and aft bulkheads include a curvilinear body portion that extends from the second segment of the lipskin to one of the first segment of the lipskin or the plurality of cores. The body portions are curved in cross section such that they are able to receive an impact load, from a birdstrike, for example, and transfer that load circumferentially about the circumference of the nacelle. Furthermore, the curvilinear body portion of the aft bulkhead is configured to react to radial loads caused by a fan blade out event. As such, the exemplary engine nacelle eliminates the need for an additional crush zone component to react to the radial load. Moreover, the forward bulkhead is formed from a thermal insulating material such that independent insulating components are not required in the exemplary nacelle. Accordingly, the forward and aft bulkheads facilitate reducing the part count of the engine nacelle and provide for a lighter, less expensive, and more easily serviceable engine nacelle.

Used in combination, the features described above provide for a noise attenuating engine nacelle that is easier to manufacture, more fuel efficient, less expensive, more easily serviceable, and more lightweight than conventional engine nacelles. However, while a preferred implementation of the engine nacelle includes each of the features described above, it is contemplated that any one of such features provides for an improved engine nacelle as compared to known nacelles. As such, the exemplary engine nacelle described herein may have one, all, or any combination of the features described above.

Referring more particularly to the drawings, implementations of the disclosure may be described in the context of a nacelle 10 shown schematically in cross-section in FIG. 1. In an implementation, nacelle 10 encloses a turbofan engine for use with an aircraft. It should be understood, however, that the disclosure applies equally to nacelles for other types of engines, as well as to other structures subjected to noise-generating fluid flow in other applications, including but not limited to automobiles, heavy work vehicles, and other vehicles.

In the illustrated implementation, nacelle 10 extends generally circumferentially about a centerline 12. A lipskin assembly 14 includes a first lipskin assembly segment 16 that extends from a first lipskin edge 18 to a hilite 20 to define a generally diffuser-shaped inlet 22 of nacelle 10. As such, first assembly segment 16 forms at least a portion of an interior wall positioned on an interior 23 of nacelle 10.

Lipskin assembly 14 further includes a second assembly segment 24 that extends from hilite 20 to a second lipskin edge 26 to form at least a portion of an exterior wall of nacelle 10. More specifically, second lipskin segment 24 forms a portion of a radially outer barrel 28 positioned on an exterior 29 of nacelle 10. A radially inner barrel 30 extends from a first inner barrel edge 32, proximate to first lipskin edge 18, to a second inner barrel edge 34. Inner barrel 30 includes a radially inner surface 38 and a generally concentric radially outer surface 40 that forms an interior wall of nacelle 10. Radially inner surface 38 is disposed proximate to an airflow 42 that enters through inlet 22 and flows generally in a downstream direction 44 when nacelle 10 is in an operational state.

In an implementation, inner barrel 30 is coupled to lipskin assembly 14 through a plurality of circumferentially spaced gusseted brackets 36. More specifically, gusseted brackets 36 extend from first inner barrel edge 32 and are configured to couple to first lipskin edge 18. In alternative implementations, inner barrel 30 and lipskin 14 are coupled in any suitable fashion that enables nacelle 10 to function as described herein.

A generally annular forward bulkhead 50 extends radially between an interior wall, such as one of first lipskin segment 16 or inner barrel 30, and an exterior wall, such as second lipskin segment 24, of nacelle 10. More specifically, in the exemplary implementation, forward bulkhead 50 extends between first lipskin segment 16, which is operable as a first portion of the interior wall, and second lipskin segment 24 such that forward bulkhead 50 and a portion of lipskin assembly 14 form a D-duct first plenum 51. Alternatively, forward bulkhead 50 may extend between inner barrel 30, which is operable as a second portion of the interior wall, and second lipskin segment 24. In the exemplary implementation, plenum 51 is an annular plenum extending about nacelle 10 that is configured to channel a flow of heated air received by an ice prevention system (not shown). In some embodiments, the heated air may be configured to transpire through lipskin assembly 14 to prevent the formation of ice crystals on nacelle 10.

In the illustrated implementation, forward bulkhead 50 extends from first lipskin segment 16 generally proximate to first lipskin edge 18. In addition, a generally annular aft bulkhead 70 extends radially between inner barrel 30 and second lipskin assembly segment 24. In the illustrated implementation, aft bulkhead 70 extends from inner barrel 30 generally proximate to second inner barrel edge 34. Aft bulkhead 70 is axially-spaced from forward bulkhead 50 to define a second plenum 53 therebetween that is radially bound by outer barrel 28 and inner barrel 30. In alternative implementations, forward bulkhead 50 and aft bulkhead 70 are disposed in any suitable position that enables nacelle 10 to function as described herein.

Figure 2:
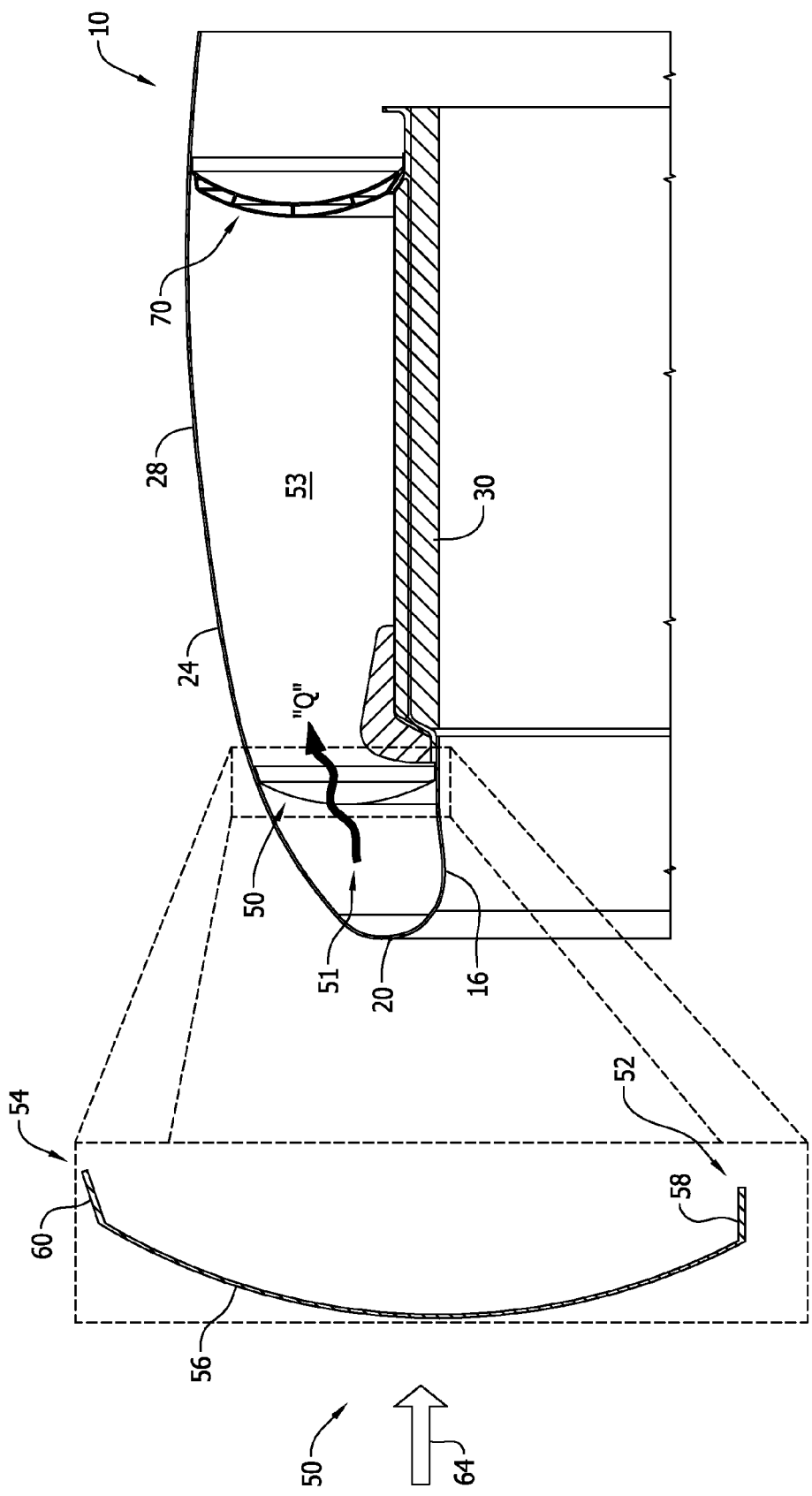
FIG. 2 is a cross-sectional view of the engine nacelle shown in FIG. 1 illustrating an exemplary forward bulkhead.

FIG. 2 is a cross-sectional view of engine nacelle 10 illustrating an enlarged view of forward bulkhead 50. In the exemplary implementation, forward bulkhead 50 is an annular wall extending about interior 23 of nacelle 10. Forward bulkhead 50 includes an inner end 52, an outer end 54, and a body portion 56 extending therebetween, wherein body portion 56 has a curvilinear cross-sectional shape between an exterior wall, such as second lipskin segment 24, and an interior wall, such as one of first lipskin segment 16 or inner barrel 30. More specifically, inner end 52 includes an inner flange 58 extending about its circumference such that inner flange 58 is coupled to one of first lipskin segment 16 or inner barrel 30. Outer end 54 includes an outer flange 60 extending about its circumference such that outer flange 60 is coupled to outer barrel 28, or, more specifically, to second lipskin segment 24. In the exemplary implementation, body portion 56 is curved between flanges 58 and 60. Alternatively, body portion 56 may be curved over an entire length of forward bulkhead 50 between first and second ends 52 and 54.

In the exemplary implementation, forward bulkhead 50 is formed from a ceramic matrix composite (CMC) material. CMC materials are known to have efficient insulating properties such that the use of a separate insulator to prevent heat transfer from first plenum to second plenum 53 is not required. Components positioned in second plenum 53, such as inner barrel 30, are generally formed from composite materials that are temperature sensitive. Forward bulkhead 50 is configured to prevent transfer of heat, indicated by arrow Q, from first plenum 51 into second plenum 53 such that composite components of nacelle 10 positioned in second plenum 53 are not structurally compromised. Furthermore, many CMC materials have a coefficient of thermal expansion similar to that of the materials from which lipskin assembly 14 is formed such that lipskin assembly 14 and forward bulkhead 50 are configured to expand and contract at similar rates in response to rising and falling temperatures to maintain the aerodynamic properties of nacelle 10. Alternatively, forward bulkhead 50 may be formed from superplastic formed, diffusion bonded titanium to provide a double-walled structure that includes a layer of air pockets that thermally insulate plenum 53 from plenum 51. Generally, forward bulkhead 50 may be formed from any material that facilitates forward bulkhead 50 to operate as described herein.

In the exemplary implementation, curvilinear body portion 56 is oriented such that the curve protrudes in an upstream direction, opposite direction 44 of airflow 42 through nacelle 10, towards hilite 20 of lipskin assembly 14. In the exemplary embodiment, body portion 56 includes a uniform (circular) radius of curvature. Alternatively, body portion 56 may include a non-uniform radius of curvature, such as parabolic or hyperbolic. During operation, forward bulkhead 50 is configured to receive an impact load 64 and to transfer load 64 circumferentially about the circumference of nacelle 10. More specifically, in the event of a foreign object impact, such as, but not limited to, a birdstrike, upon forward bulkhead 50, curvilinear body portion 56 of forward bulkhead 50 is configured to axially compress such that load 62 is transferred through flanges 58 and 60 to inner barrel 30 and outer barrel 28, respectively. As such, load 64 is distributed about inner and outer circumferences of nacelle 10 and not only through annular forward bulkhead 50. After impact, body portion 56 may then return to its original shape.

Figure 3:
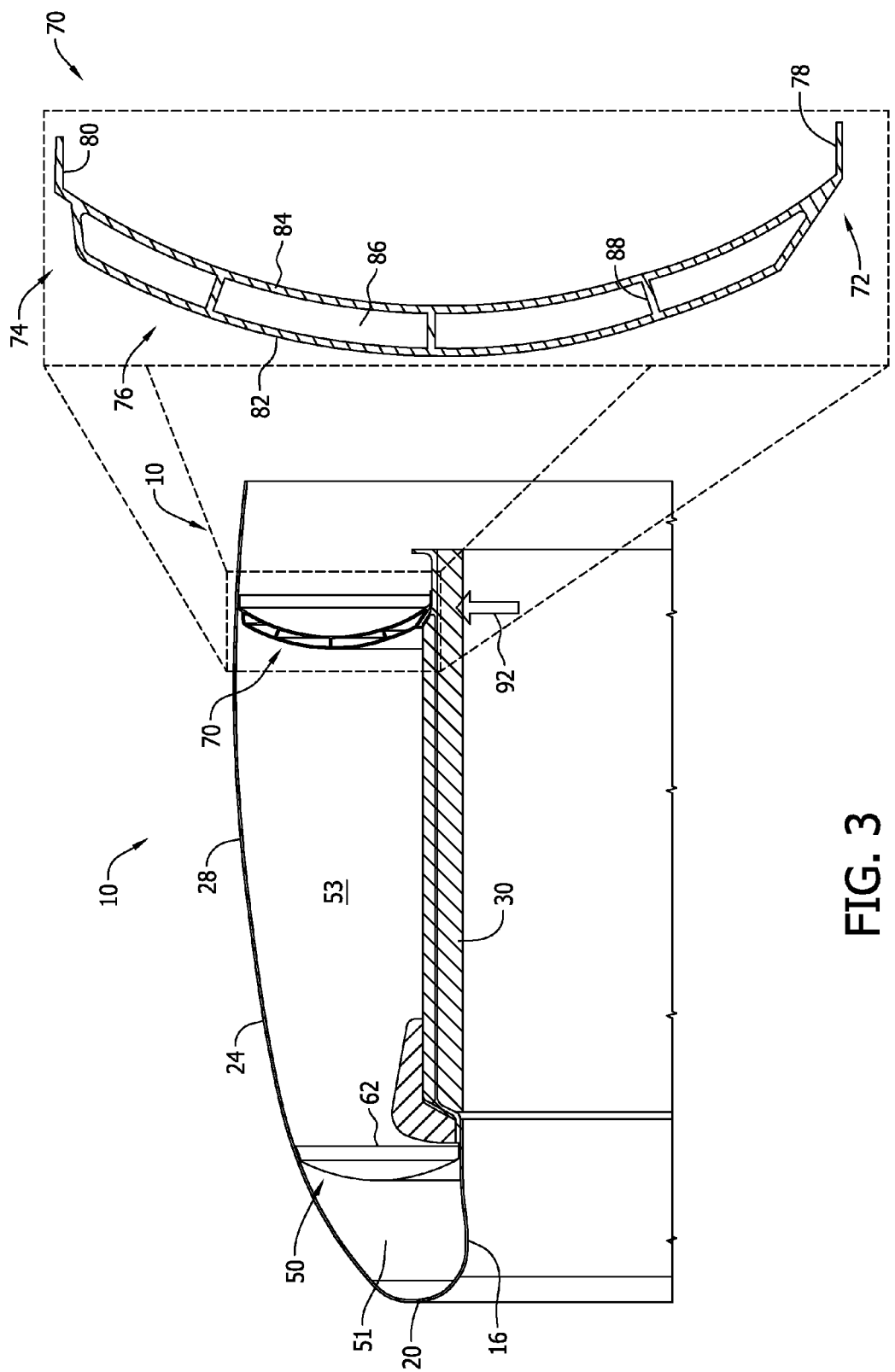
FIG. 3 is a cross-sectional view of the engine nacelle shown in FIG. 1 illustrating an exemplary aft bulkhead.

FIG. 3 is a cross-sectional view of engine nacelle 10 illustrating an enlarged view of aft bulkhead 70. In the exemplary implementation, aft bulkhead 70 is an annular wall extending about interior 23 of nacelle 10. Aft bulkhead 70 includes an inner end 72, an outer end 74, and a curvilinear body portion 76 extending therebetween. Inner end 72 includes an inner flange 78 extending about its circumference such that inner flange 78 is coupled to inner barrel 30. Outer end 74 includes an outer flange 80 extending about its circumference such that outer flange 80 is coupled to outer barrel 28, or, more specifically, to second lipskin segment 24. In the exemplary implementation, body portion 76 is curved between flanges 78 and 80. Alternatively, body portion 76 may be curved over an entire length of aft bulkhead 70 between first and second ends 72 and 74.

In the exemplary implementation, curvilinear body portion 76 is oriented such that the curve protrudes in a forward direction towards forward bulkhead 50. In the exemplary embodiment, body portion 76 includes a uniform (circular) radius of curvature. Alternatively, body portion 76 may include a non-uniform radius of curvature, such as parabolic or hyperbolic. Furthermore, body portion 76 includes a forward wall 82 and an aft wall 84 that is spaced apart from forward wall 82 to define a cavity 86 therebetween. Aft wall 84 is coupled to flanges 78 and 80 and forward wall 82 is coupled to aft wall 84. In the exemplary implementation, forward and aft walls 82 and 84 are both uniformly curved and have the same radius of curvature such that cavity 86 has a substantially constant width. Alternatively, forward wall 82 may be curved and aft wall 84 may be flat such that cavity 86 has a substantially semi-circular shape. Cavity 86 is configured to an amount of insulating air between forward and aft walls 82 and 84 such that aft bulkhead 70 further insulates components aft of bulkhead 70 from heat within second plenum 53.

In the exemplary implementation, body portion 76 includes a strengthening structure 88 that extends between forward and aft walls 82 and 84. Structure 88 may be one of a honeycomb core or circumferentially-spaced spars configured to provide additional axial strength to react load 64. Generally, structure 88 may be any mechanism that strengthens body portion 76. In the exemplary implementation, aft bulkhead 70 is formed from a single piece of super-plastic formed, diffusion bonded titanium that provides for a lighter and easier to assemble aft bulkhead 70. Generally, aft bulkhead 70 may be formed from any material that facilitates aft bulkhead 70 to operate as described herein.

During operation, a foreign object, such as a bird, may be large enough that load 64 exceeds the structural limits of forward bulkhead 50 such that the foreign object may penetrate forward bulkhead 50 and impacts aft bulkhead 70. Industry regulations require that aft bulkhead 70 arrest the axial penetration of the foreign object through nacelle 10. As such, in conditions where the foreign object penetrates forward bulkhead 50, aft bulkhead 70 is configured to receive impact load 64 and to transfer load 64 circumferentially about the circumference of nacelle 10. More specifically, in the event of a foreign object impact upon aft bulkhead 70, curvilinear body portion 76 of aft bulkhead 70 is configured to axially compress such that load 62 is transferred through flanges 78 and 80 to inner and outer barrel 30 and 28, respectively. As such, load 64 is distributed about inner and outer circumferences of nacelle 10 and not only through annular forward bulkhead 50. After impact, body portion 56 may then return to its original shape.

Furthermore, aft bulkhead 70 is configured to react to radial loads caused by a fan blade out (FBO) event, such load is represented by arrow 92. If the fan of the engine within nacelle 10 throws a blade, the centrifugal force may cause the broken blade to impact the engine fan case (not shown). The nacelle inlet will experience a propagation of the impact, and a portion of the resulting load, load 92, is transferred from inner barrel 30 into aft bulkhead 70. More specifically, load 92 is transferred into inner end 72, travels through body portion 76, and is distributed about a circumference of outer barrel 28. Curvilinear body portion 76 is configured to compress in the radial direction to absorb a portion of load 92 such that less load is distributed to outer barrel 28. As such, aft bulkhead 70 is configured to increase the survivability of nacelle 10 during an FBO. Moreover, nacelle 10 does not require an additional crush zone component that compresses under FBO loads because curvilinear aft bulkhead 70 performs the same function. After impact of either of loads 62 and/or 92, body portion 76 may then return to its original shape.

An implementation of a method of assembling an engine nacelle, such as nacelle 10, having an interior wall, such as lipskin assembly first segment 16 or structural inner barrel 30, and an exterior wall, such as lipskin assembly second segment 24 is provided. The method includes coupling a forward bulkhead, such as forward bulkhead 50, between the interior wall and the exterior wall, wherein the forward bulkhead includes a curvilinear body portion, such as body portion 56, that extends between the interior wall and the exterior wall. The method also includes coupling an aft bulkhead, such as aft bulkhead 70, between the interior wall and the exterior wall, wherein the aft bulkhead includes a curvilinear body portion, such as body portion 76, that extends between the interior wall and the exterior wall.

Each of the processes of the method may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The implementations described herein provide a structurally sound engine nacelle and method for assembling the same. The implementations provide for an engine nacelle that includes a lipskin assembly having a first segment and a second segment, a structural inner barrel, a forward bulkhead, and an aft bulkhead. Each of the forward and aft bulkheads includes a curvilinear body portion that extends from the second segment of the lipskin to one of the first segment of the lipskin or the inner barrel. The body portions are curved in cross section such that they are able to receive an impact load, from a birdstrike, for example, and transfer that load circumferentially about the circumference of the nacelle. The curvilinear body portions are configured to axially compress such that the load is transferred through the ends of the body portions. Furthermore, the curvilinear body portion of the aft bulkhead is configured to react to radial loads caused by a fan blade out event. If a loose blade impacts the inner barrel, the radial load is transferred into curvilinear body portion of the aft bulkhead and is distributed about a circumference of the nacelle. The curvilinear body portion of the aft bulkhead is configured to compress in the radial direction to absorb a portion of load caused by the fan blade out event. As such, the exemplary engine nacelle eliminates the need for an addition crush zone component to react to the radial load. Moreover, the forward bulkhead is formed from a thermal insulating material such that independent insulating components are not required in the exemplary nacelle. Accordingly, the forward and aft bulkheads described herein facilitate reducing the parts count of the engine nacelle and provide for a lighter, less expensive, and more easily serviceable engine nacelle.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An engine nacelle comprising:
   an exterior wall;
   an interior wall;
   a forward bulkhead coupled between said interior wall and said exterior wall wherein said forward bulkhead comprises a curvilinear body portion that extends between said interior wall and said exterior wall; and
   an aft bulkhead comprising a first end coupled to said interior wall and a second end coupled to said exterior wall, wherein said aft bulkhead comprises a curvilinear body portion that extends between said interior wall and said exterior wall from said first end to said second end.

2. The engine nacelle in accordance with claim 1 further comprising:
   a lipskin assembly comprising a first segment and a second segment wherein said first segment is operable as a first portion of said interior wall and said second segment is operable as said exterior wall; and
   a structural inner barrel operable as a second portion of said interior wall.

3. The engine nacelle in accordance with claim 2, wherein said forward bulkhead is coupled between said second segment and one of said first segment or said inner barrel.

4. The engine nacelle in accordance with claim 2, wherein said aft bulkhead is coupled between said second segment and said inner barrel.

5. The engine nacelle in accordance with claim 1, wherein said forward bulkhead body portion and said aft bulkhead body portion each protrude in an upstream direction opposite a direction of airflow through said engine nacelle.

6. The engine nacelle in accordance with claim 1, wherein said forward bulkhead further comprises an inner flange coupled between said body portion and said interior wall and an outer flange coupled between said body portion and said exterior wall, and wherein said aft bulkhead further comprises an inner flange coupled between said body portion and said interior wall and an outer flange coupled between said body portion and said exterior wall.

7. The engine nacelle in accordance with claim 1, wherein said aft bulkhead body portion comprises a forward wall, an aft wall, and strengthening structure extending therebetween.

8. The engine nacelle in accordance with claim 1, wherein said forward bulkhead is formed from a ceramic matric composite.

9. The engine nacelle in accordance with claim 1, wherein said aft bulkhead is formed from a super-plastic formed diffusion-bonded titanium.

10. An aircraft comprising:
    an engine nacelle comprising:
       a lipskin comprising a first segment and a second segment;
       a structural inner barrel;
       a forward bulkhead comprising a curvilinear body portion that extends between one of said first segment or said inner barrel and said second segment; and
       an aft bulkhead axially-spaced from said forward bulkhead, said aft bulkhead comprising a first end coupled to said inner barrel and a second end coupled to said lipskin, wherein said aft bulkhead comprises a curvilinear body portion that extends between said structural inner barrel and said second segment from said first end to said second end.

11. The aircraft in accordance with claim 10, wherein said forward bulkhead body portion and said aft bulkhead body portion each protrude in an upstream direction opposite a direction of airflow through said engine nacelle.

12. The aircraft in accordance with claim 10, wherein said forward bulkhead further comprises an inner flange coupled between said body portion and one of said first segment or said structural inner barrel and an outer flange coupled between said body portion and said second segment, and wherein said aft bulkhead further comprises an inner flange coupled between said body portion and said structural inner barrel and an outer flange coupled between said body portion and said second segment.

13. The aircraft in accordance with claim 12, wherein said forward bulkhead further comprises a reinforcing wall coupled between said inner and said outer flanges.

14. The aircraft in accordance with claim 10, wherein said aft bulkhead body portion comprises a forward wall, an aft wall, and strengthening structure extending therebetween.

15. A method of assembling an engine nacelle having an interior wall and an exterior wall, said method comprising:
    coupling a forward bulkhead between the interior wall and the exterior wall, wherein the forward bulkhead includes a curvilinear body portion that extends between the interior wall and the exterior wall; and
    coupling an aft bulkhead between the interior wall and the exterior wall, wherein the aft bulkhead includes a first end coupled to the interior wall and a second end coupled to the exterior wall, and a curvilinear body portion that extends between the interior wall and the exterior wall from the first end to the second end.

16. The method in accordance with claim 15, wherein coupling a forward bulkhead between the interior wall and the exterior wall further comprises coupling the forward bulkhead between one of a first segment of a lipskin assembly or a structural inner barrel and a second segment of the lipskin assembly.

17. The method in accordance with claim 15, wherein coupling an aft bulkhead between the interior wall and the exterior wall further comprises coupling the aft bulkhead between a structural inner barrel and a lipskin assembly.

18. The method in accordance with claim 15, wherein coupling a forward bulkhead between the interior wall and the exterior wall further comprises coupling the forward bulkhead between the interior wall and the exterior wall such that the body portion protrudes in an upstream direction opposite a direction of airflow through the engine nacelle.

19. The method in accordance with claim 15, wherein coupling an aft bulkhead between the interior wall and the exterior wall further comprises coupling the aft bulkhead between the interior wall and the exterior wall such that the body portion protrudes in an upstream direction opposite a direction of airflow through the engine nacelle.

20. The method in accordance with claim 15 further comprising:
    coupling a forward reinforcement wall between the interior and exterior walls aft of the forward bulkhead body portion; and
    coupling an aft reinforcement wall between the interior and exterior walls aft of the aft bulkhead body portion.

* * * * *